United States Patent [19]

Mink

[11] 3,972,422
[45] Aug. 3, 1976

[54] MATERIAL HANDLING APPARATUS

[76] Inventor: George Mink, 13130 Geoffrey, Warren, Mich. 48093

[22] Filed: Sept. 16, 1974

[21] Appl. No.: 506,113

[52] U.S. Cl. ............................ 214/1 BB; 214/147 T
[51] Int. Cl.² ......................................... B25J 3/00
[58] Field of Search ...................... 214/1 BB, 147 T

[56] References Cited
UNITED STATES PATENTS

| | | | |
|---|---|---|---|
| 2,763,229 | 9/1956 | Sahlin | 214/147 T |
| 2,899,043 | 8/1959 | Young | 214/1 BB X |
| 3,013,835 | 12/1961 | Blatt | 214/1 BB X |
| 3,764,023 | 10/1973 | Jatcko | 214/147 T X |
| 3,780,423 | 12/1973 | Lilienthal | 214/1 BB X |

*Primary Examiner*—Robert J. Spar
*Assistant Examiner*—Ross Weaver
*Attorney, Agent, or Firm*—Harness, Dickey & Pierce

[57] ABSTRACT

A material handling apparatus adapted to grip a workpiece and move it from one position to another position where it is released. The apparatus includes gripping fingers that are pivotal between a released position and a gripping position and a carrier for the gripping fingers that is movable from a first position to a second position. Actuating means moves the gripping fingers to their gripping position when the positioning means move the carrier to a first position and for moving the gripping fingers to a released position when the positioning means moves the carrier to its second position.

8 Claims, 6 Drawing Figures

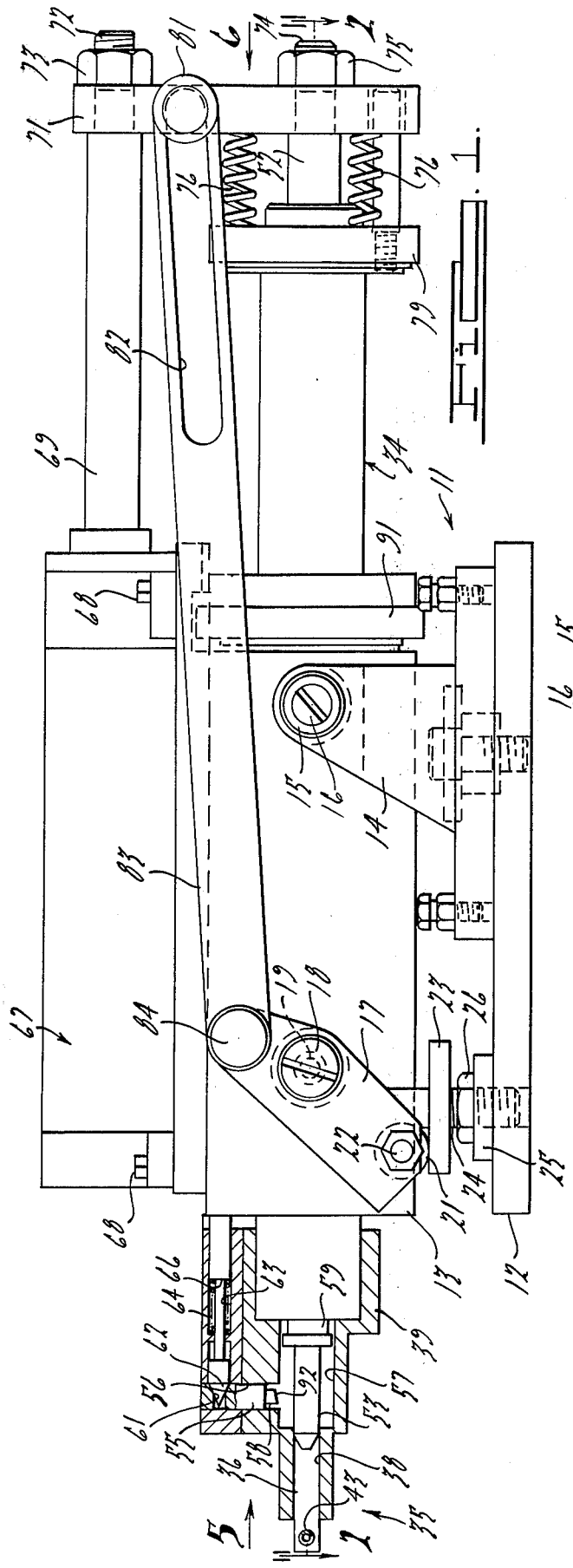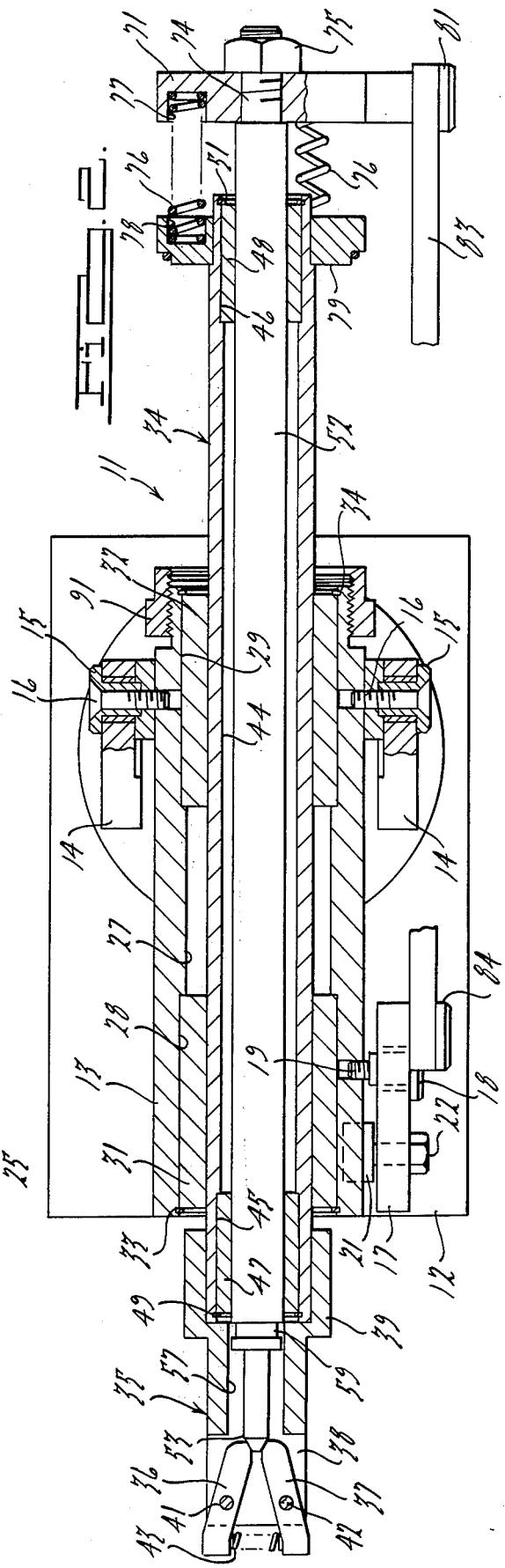

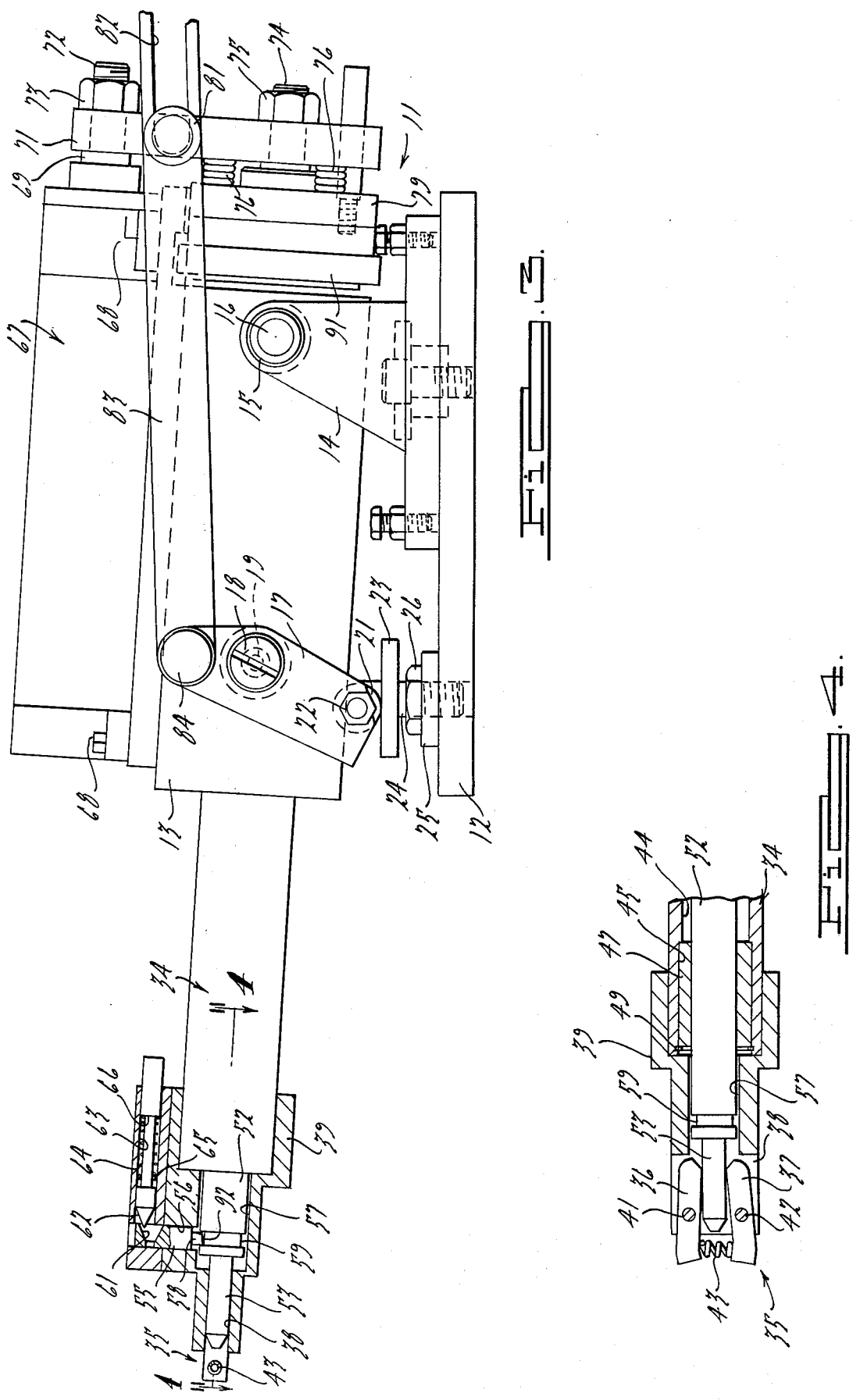

MATERIAL HANDLING APPARATUS

BACKGROUND OF THE INVENTION

This invention relates to a material handling apparatus.

In many types of machines it is desirable to provide a mechanism that will grasp a workpiece and move it from one position to another. Such mechanisms should be capable of moving the workpiece and gripping it without damage. It is, therefore, a principal object of this invention to provide an improved material handling apparatus.

SUMMARY OF THE INVENTION

This invention is adapted to be embodied in a material handling apparatus that includes gripping means and means supporting the gripping means for movement between a released position and a gripping position. Positioning means are provided for moving the gripping means from a first position to a second position. Actuating means are also provided for moving the gripping means to its gripping position when the positioning means moves the gripping means to its first position and for moving the gripping means to its released position when the positioning means moves the gripping means to its second position.

BRIEF DESCRIPTION OF THE DRAWINGS

FIG. 1 is a side elevational view, with portions broken away, of a material handling apparatus embodying this invention and shows the apparatus in a retracted, open position.

FIG. 2 is a cross sectional view of the apparatus shown in FIG. 1 taken along the line 2—2.

FIG. 3 is a side elevational view, with a portion broken away, in part similar to FIG. 1, and shows the apparatus in its extended, gripping position.

FIG. 4 is a cross sectional view taken along the line 4—4 of FIG. 3.

DETAILED DESCRIPTION OF THE PREFERRED EMBODIMENT

Figure 5:
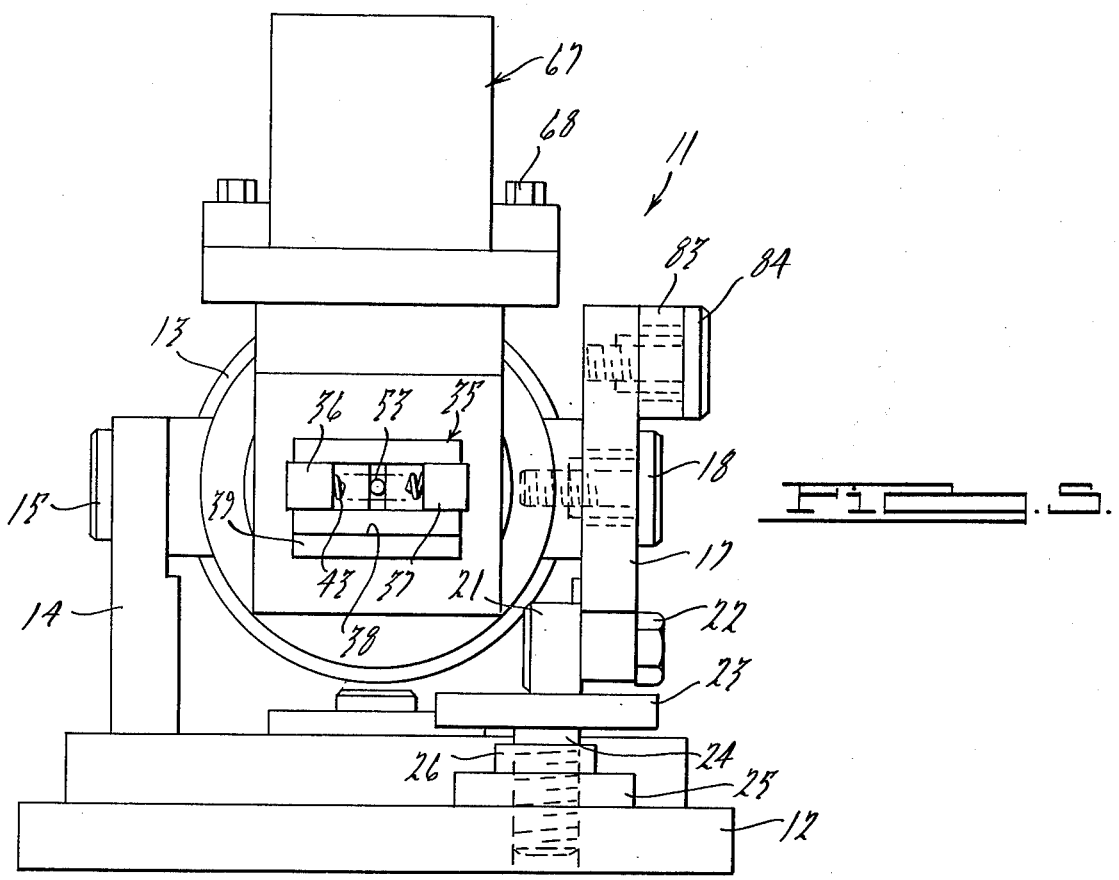
FIG. 5 is an end view of the apparatus taken generally in the direction of the arrow 5 in FIG. 1.
Figure 6:
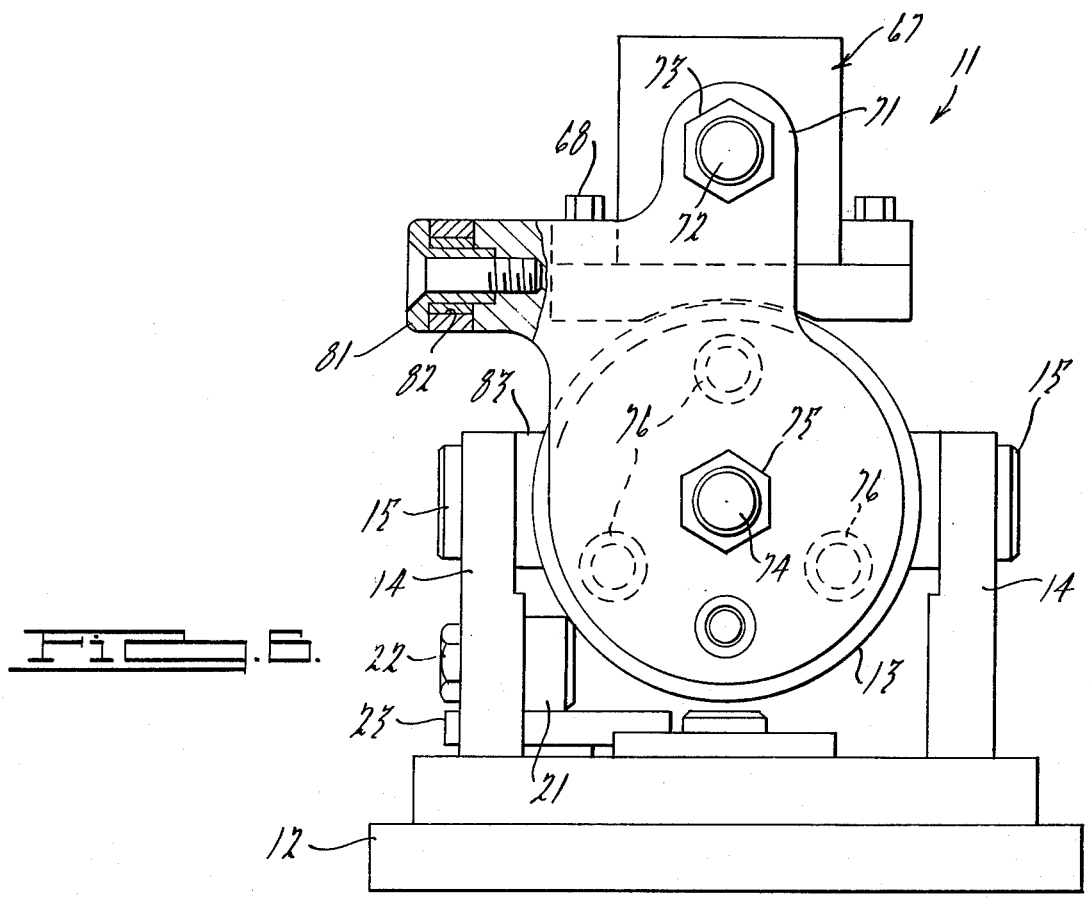
FIG. 6 is an end view taken in the direction of the arrow 6 in FIG. 1, with a portion broken away.

In the drawings the reference numeral 11 indicates generally a material handling apparatus embodying this invention. The material handling apparatus 11 includes a base plate 12 that is adapted to be affixed in any known manner to an associated component of a machine tool or the like. A cylinder assembly 13 is supported upon a base plate 12. In the illustrated embodiment, the cylinder assembly 13 is supported for pivotal movement since the material handling apparatus is adapted to move a workpiece in two directions. As will become apparent, the cylinder assembly 13 may be rigidly mounted upon the base plate 12 in the event movement in only one direction is required.

A pair of spaced trunions 14 are fixed to the base plate 12 on opposite sides of the cylinder 13. The trunions 14 receive pivot pins 15 that are affixed by machine screws 16 to the cylinder 13 to pivotally support the cylinder 13 on the base plate 12. A bell crank 17 is pivotally connected to one side of the cylinder 13 by means of a pivot pin 18 and machine screw 19. The bell crank 17 carries a roller 21 at one of its ends on a shaft 22. The roller 21 bears against a washer or bearing plate 23 that is adjustably fixed to the base plate 12 by means of a machine screw 24, nut 25 and jam nut 26.

The cylinder 13 is formed with a longitudinally extending bore 27 (FIG. 2) with counterbores 28 and 29 formed at its opposite ends. Plain bearings 31 and 32 are received within the counterbores 28 and 29 and held in place by respective snap rings 33 and 34. The bearings 31 and 32 slidably support a positioning member, indicated generally by the reference numeral 34. The positioning member 34 carries a gripping mechanism, indicated generally by the reference numeral 35, at its outer end.

The gripping mechanism includes a pair of gripping fingers 36 and 37 that are positioned in a cavity 38 formed at a bifurcated end of a supporting collar 39. The supporting collar 39 is affixed in any suitable manner to the outer end of the positioning member 34. The gripping fingers 36 and 37 are pivotally supported for movement between an opened position and a gripping position by means of respective pivot pins 41 and 42. A coil compression spring 43 is positioned between the outer ends of the gripping fingers 36 and 37 to urge the fingers to the opened position as shown in FIG. 2. The gripping fingers 36 and 37 are adapted to carry any suitably configured jaws (not shown) for engaging a workpiece.

The positioning member 34 has a generally tubular shape and has a longitudinally extending bore 44. Counterbores 45 and 46 are formed at the opposite ends of the bore 44 and receive respective plain bearings 47 and 48. The bearings 47 and 48 are held axially in position by respective snap rings 49 and 51. An actuating member 52 for the gripping fingers 36 and 37 is slidably supported by the bearings 47 and 48. The actuating member 52 has an extending cam portion 53 that engages the inner ends of the gripping fingers 36 and 37.

A detent member 55 (FIGS. 1 and 3) is slidably supported in a bore 56 of the collar 39 which intersects a bore 57 through which the actuating member cam portion 53 extends. The detent member 55 has a cylindrical end portion 58 that is adapted to cooperate with a cylindrical groove 59 formed in the actuating member 52 for retaining the actuating member in a position in which the gripping fingers 36 and 37 are held in their gripping position (FIGS. 3 and 4).

The detent member 55 is formed with a conical recess 61 that is adapted to receive a complimentary shaped conical plunger 62. The plunger 62 is slidably supported in a bore 63 formed adjacent and parallel to the bore 57. The plunger 62 is encircled by a coil compression spring 64 that engages a shoulder 65 formed adjacent the plunger conical portion 62. The opposite end of the spring 64 engages a shoulder 66 formed on the plunger to urge the plunger to the position shown in FIG. 3. In this position, the detent member 55 may engage the circumferential groove 59 of the actuating member 52.

A pneumatic or hydraulic actuating cylinder, indicated generally by the reference numeral 67 is supported on the cylinder 13 in any known manner, by means of machine screws 68. The actuating cylinder 67 includes a piston rod 69 that will reciprocate upon operation of the cylinder 67 between a first position as shown in FIGS. 1 and 2 and a second position as shown in FIGS. 3 and 4. A plate 71 is fixed to the outer end of the piston rod 69 by means including a threaded end 72 of the piston rod and nut 73. The plate extends from the piston rod 69 to the actuating member 52 and is also affixed to the actuating member 52 by means of a threaded end 74 of the latter and a nut 75 (FIG. 2). Thus, reciprocation of the piston rod 69 will be transmitted into reciprocation of the actuating member 52.

A plurality of compression springs 76 are received in complimentary bores 77 of the plate 71. The opposite ends of the springs 76 are received in bores 78 of a collar 79 that is affixed to the end of the positioning member 34. The springs 76 tend to maintain the plate 71 and collar 79 in a spaced relationship as shown in FIGS. 1 and 2.

The plate 71 also has affixed to it a pin member 81 that has a reduced diameter portion which is slidably received in an elongated slot 82 of an actuating link 83. The actuating link 83 is pivotally connected to the bell crank 17 by means of a pivot pin 84. The construction consisting of the pin 81, actuating link 83 and pivot pin 84 is provided when translational movement of the cylinder 13 is desired, as will become apparent.

OPERATION

As has been noted, the material handling apparatus 11 may be used for a variety of purposes. For example, the material handling apparatus 11 may be used to remove workpieces from a press thus obviating the necessity for an operator to place his hands in the dangerous portion of the press.

FIGS. 1 and 2 illustrate the device in a retracted position in which the gripping fingers 36 and 37 are opened. In this position, the piston rod 69 of the actuating cylinder 67 is in its extreme position. As a result, the positioning member 34 will be moved to an inward extreme position along with the gripping mechanism 35. The springs 76 will urge the positioning member 34 relative to the actuating member 52 so that the actuating member cam portion 53 will permit the gripping fingers 36 and 37 to pivot to their open position. At this time, the plunger 62 will be engaged with a face of the cylinder 13 so that the plunger conical portion fits into the conical opening 61 of the detent 55 to hold the detent 55 in a retracted position.

When it is desired to remove a workpiece from the associated press, the cylinder 67 is actuated so that the piston rod 69 begins its stroke from the position shown in FIG. 1 to the position shown in FIG. 3. Initial movement of the plate 71 will cause the positioning device 34 and actuating device 52 to move together, the force to the former being transmitted through the springs 76. During this initial movement, the pin 81 will traverse the slot 82.

As the gripping device 35 moves away from the cylinder 13, the plunger 62 will be urged by the spring 64 to the position shown in FIG. 3 so that the detent 55 will be in position for operation. The detent 55 will not, however, engage the groove 59 at this time since the actuating member 52 will still be in the position shown in FIG. 2. As the gripping device 35 approaches the workpiece, the collar 79 will engage an adjustable stop 91 threaded onto an end of the cylinder 13 and prevent the positioning member 34 from further movement. At this time, the spring 76 will compress and permit relative movement between the positioning member 34 and the actuating member 52. Thus, the actuating member cam portion 53 will move between the gripping fingers 36 and 37 from the position shown in FIG. 2 to the position shown in FIG. 4 causing the gripping fingers 36 and 37 and the jaws carried thereby (not shown) to move into gripping engagement with the workpiece. When this occurs, the detent 55 will be cammed over the enlarged portion of the actuating member 52, by an inclined surface 92, and fall into place in the groove 59. The gripping fingers 36 and 37 are, therefore, retained in their gripping position while the workpiece is held.

During the final movement of the piston rod 69, the pin 81 will have completed its traversal of the slot 82 and cause a force to be exerted on the actuating link 83. This force is transmitted through the pivot pin 84 to the bell crank 17. The roller 21 will engage the plate 23 and cause the forward end of the cylinder 13 to be pivoted relative to the supporting plate 12 from the position shown in FIG. 1 to the position shown in FIG. 3. Thus, the gripping device 35 is moved in two senses. If desired, this latter degree of movement may be eliminated by elimination of the link 83 and the bell crank 17 although the latter element need not be deleted.

When the workpiece has been gripped by the jaws associated with the gripping fingers 36 and 37, the actuating cylinder 67 is operated to cause reversal of the movement of the piston rod 69. The piston rod 69 will then extend carrying with it the plate 71. Since the detent 55 is received in the groove 59, the positioning member 34 and actuating member 52 will be constrained from movement together and the springs 76 will be held compressed. The elements, therefore, move together to remove the workpiece and draw it toward the cylinder 13. This movement continues until the plunger 62 engages the cylinder 13. At this time, the plunger will be driven forwardly so that its conical end portion enters the conical opening 61 of the detent 55. Continued movement will cause the detent 55 to be withdrawn free of the groove 59 and permit relative movement between the actuating member 52 and positioning member 34. The compression on the springs 76 will then be released and the jaws 36 and 37 will be urged to their open position by the spring 43. The workpiece will then fall free of the associated gripping jaws.

It is to be understood that the foregoing description is that of a preferred embodiment of the invention and that the invention is susceptible of change and modification within its spirit and scope as defined by the appended claims.

I claim:

1. A material handling apparatus for moving workpieces or the like between a first location and a second location, gripping means, supporting means supporting said gripping means for movement between a gripping position in which a workpiece is gripped and a released position, said supporting means being movable to position said gripping means in said first location and in a second location, single drive means including an element movable between a first position and a second position, means including a lost motion connection operably connecting said drive means element to said supporting means for moving said gripping means between said first location and said second location in response to movement of said drive means element, said lost motion connection being effective to permit movement of said drive means element from a position intermediate its first position and its second position to its first position when said gripping means remains in its first location, actuating means responsive to the movement of said drive means element from its intermediate position to its first position relative to said gripping means for moving said gripping means from one of its positions to the other of its positions, locking means for retaining said gripping means in its other position upon movement of said gripping means from its first location to its second location, and means responsive to the movement of said gripping means to its second location for releasing said locking means and permitting said actuating means to move said gripping means from its other position to its one position.

2. A material handling apparatus as set forth in claim 1 wherein the gripping means comprises a pair of pivotally supported jaws.

3. A material handling apparatus as set forth in claim 1 wherein the drive means element moves the gripping means rectalinearly between its first location and its second location.

4. A material handling apparatus as set forth in claim 3 wherein the drive means element additionally moves the gripping means in a transverse direction from its first location to its second location.

5. A material handling apparatus as set forth in claim 4 wherein the gripping means comprises a pair of pivotally supported jaws.

6. A material handling apparatus as set forth in claim 2 wherein the supporting means comprises a tubular member supported for movement between a first position and a second position, the jaws being pivotally supported by the tubular member.

7. A material handling apparatus as set forth in claim 6 wherein the actuating means comprises a cam member slidably supported within the tubular member and having a cam engagement with said jaws, said cam member being movable relative to said tubular member upon the occurence of the lost motion permitted by said lost motion connection.

8. A material handling apparatus as set forth in claim 7 wherein the locking means comprises a detent lock for locking said cam means in engagement with the jaws for retaining the jaws in their gripping position, said detent lock being movable between its locked position and a released position in response to return movement of the gripping means to its second location.

* * * * *